United States Patent [19]
Wah Lo et al.

[11] Patent Number: 5,802,410
[45] Date of Patent: Sep. 1, 1998

[54] METHOD AND APPARATUS FOR PRODUCING COMPOSITE IMAGES WITH A MASKED IMAGING DEVICE

[76] Inventors: Allen Kwok Wah Lo, 5022 Hidden Branches Dr., Dunwoody, Ga. 30338; Kenneth Ouochuy Lao, 650 Glen Ave., Westfield, N.J. 07090

[21] Appl. No.: 801,991
[22] Filed: Feb. 18, 1997
[51] Int. Cl.⁶ .................................................. G03B 35/00
[52] U.S. Cl. ........................ 396/330; 348/42; 359/463
[58] Field of Search ................................ 396/324, 330; 348/42, 49; 352/57, 58, 60, 62, 86; 359/462, 463, 478

[56] References Cited

U.S. PATENT DOCUMENTS

| | | | |
|---|---|---|---|
| Re. 35,029 | 8/1995 | Sandor et al. | 355/22 |
| 4,800,407 | 1/1989 | Wah Lo | 396/326 |
| 5,098,302 | 3/1992 | Sekiguchi | 434/426 |
| 5,099,320 | 3/1992 | Allio | 358/88 |
| 5,448,322 | 9/1995 | Bacs, Jr. | 396/324 |

OTHER PUBLICATIONS

T. Ososhi "Three Dimensional Imaging Technique" 1976 pp. 16–17 (Academic Press).

*Primary Examiner*—Howard B. Blankenship

[57] ABSTRACT

A method and apparatus for producing orthostereoscopic composite images in a camera having a large-aperture taking lens to form 2D images of a scene through different aperture sections on a photosensitive medium. An aperture plate having at least one window is used to select the viewing angles of the 2D images by controlling the light transmission path through the taking lens. Only one aperture section is opened at a time to allow the taking lens to form a 2D image. Each 2D image is divided into a plurality of linear segments each having a number of image bands each corresponding to an aperture section. A line-masking device such as a LCD panel comprising a plurality of linear strips can be used to allow in each 2D image only the image bands corresponding to the opened aperture section to form part of the composite image. The composite image can be displayed behind a lenticular screen or a parallax barrier for 3D viewing.

15 Claims, 6 Drawing Sheets

METHOD AND APPARATUS FOR PRODUCING COMPOSITE IMAGES WITH A MASKED IMAGING DEVICE

BACKGROUND OF THE INVENTION

The basic process in 3D photography involves capturing a series of 2D images of a scene as viewed at a plurality of horizontally-spaced vantage points, and compressing these 2D images into a composite image to be viewed behind a lenticular screen or a parallax barrier plate. U.S. Pat. No. 5,113,213 (SANDOR ET AL) discloses a multiple-step method for electronically producing composite images. According to the method disclosed by SANDOR ET AL, a number of 2D images of a scene are acquired, digitized and sectioned in a computer into image strips. The image strips in the 2D images are then selected and arranged into a composite image by an electronic interleaving process. U.S. Pat. No. 5,098,302 (SEKIGUCHI) discloses a similar electronic interleaving process for making animation pictures.

Composite images can also be produced directly in a camera. It is well-known that a large-aperture lens can be used to capture a series of 2D images at different viewing angles. One such method is to use a large-aperture taking lens to expose a number of 2D images onto a photosensitive medium underlying a lenticular screen or a parallax barrier to form a composite image. However, the composite image formed by a large-aperture lens in the above-described fashion is a pseudoscopic image and is unsuitable for 3D viewing (see for example, "Three Dimensional Imaging Techniques" by T. Okoshi, Academic Press, 1976, pages 16–17). U.S. Pat. No. 5,099,320 (ALLIO) discloses a method for converting the pseudoscopic composite image into a regular or orthostereoscopic composite image. The method disclosed by ALLIO involves cutting up the composite image formed under the lenticular screen into segments with each segment being a portion of the image underlying a lenticule; inverting each image segment along the axis of symmetry of the lenticule; and recombining the inverted segments in the same order as prior to being turned over to become an orthostereoscopic composite image.

The major disadvantage of the method by ALLIO is that it requires complicated electronic process for image inversion and recombination. The major disadvantage of the electronic interlacing method as disclosed by SANDOR ET AL and SEKIGUCHI is time consuming and thus, the method is not suitable for make 3D displays of a scene instantly. It is advantageous to provide a simple method for producing a 3D display without using a computer or a data handling circuit for image segmentation, sorting, inverting and recombining.

SUMMARY OF THE INVENTION

It is an objective of the present invention to provide a simple method and apparatus for producing orthostereoscopic composite images.

It is another objective of present invention to provide a simple method for making 3D displays and 3D hardcopies from images formed by a large-aperture taking lens.

The above objectives can be achieved by using a camera to produce a composite image wherein:

a) a taking lens with a large aperture is used to form 2D images of a scene at different viewing angles each through a different horizontally-spaced aperture section;

b) an aperture plate having one or more windows is used to control the light transmission path through the taking lens so that only one aperture section of the taking lens is opened at a time for exposure;

c) a photosensitive medium disposed in the image plane of the taking lens is used to acquire the 2D images; and d) line-masking means associated with the photosensitive medium is used to mask the photosensitive medium in accordance with the opened aperture sections so that only certain linear image bands on each 2D image are allowed to form the composite image when an aperture section is opened for image forming.

The photosensitive medium can be a photographic film or an electronic imaging device such as a vidicon tube, or a CCD chip having a plurality of pixel rows. The line-masking means can be an electronic circuit integral to the CCD chip to selectively eliminate the electric charge resulted from light exposure in the pixel rows, or a circuitry to selectively prohibit the transfer the electric charge in the pixels to the register in the CCD chip. The line-masking means can also be a light valve disposed in front of the photosensitive medium. A light valve such as a LCD panel having a plurality of linear strips which can be selectively turned on to transmit light or turned off to block off light can be used for line-masking. The light-valve is so oriented that the linear strips are parallel to the vertical axis. For illustrative purposes only, it is assumed that the aperture of the taking lens is partitioned into right, center and left sections by the aperture plate. Accordingly, the linear strips are grouped into a plurality of linear portions each portion having three linear strips—right, center and left. Each of the linear strips is corresponding to a respective aperture section of the taking lens. When one of the aperture sections is opened for image forming, only the corresponding linear strips in the light valve are turned on to expose the image onto the underlying linear sections of the photosensitive medium. For example, when the right aperture section is opened for image forming, only the right linear strip in each linear section of the light valve is turned on for exposure. In order to produce a composite image, each of the three aperture sections must be separately opened for exposure.

It should be noted that the waiting time between the opening of one aperture section and another can be varied. To make a 3D display of a scene, it is preferred that the waiting time be short so as to keep the scene unchanged. However, the waiting time can be prolonged to allow the time changes in the scene to be captured and shown in the composite image. Moreover, a longer waiting time may be needed for changing the scene when the composite image is made of a plurality of 2D images of different scenes. In that case, the scene in the 2D image formed through one aperture section may be different from the scene in the 2D image formed through another aperture section.

The composite images can be displayed on an electronic displaying device such as a CRT display or an active-matrix LCD, projected by a projector, or printed out by a printer. The composite image produced on film can be directly attached behind a lenticular screen for viewing. It should be noted that, however, the composite image so produced is a mirror image and it must be correctly displayed. For example, if the composite image is produced on photographic paper, the image should be formed through the reflection of a mirror to reverse the mirror image.

It is understood that a parallax barrier can be used in lieu of a lenticular screen for 3D viewing, and the aperture of a taking lens can be partitioned into any number of sections, ranging from 2 to 50 or more.

The objectives and scope of the present invention will be apparent upon reading the description of the drawing figures.

DETAILED DESCRIPTION OF THE DRAWING

Figure 1:
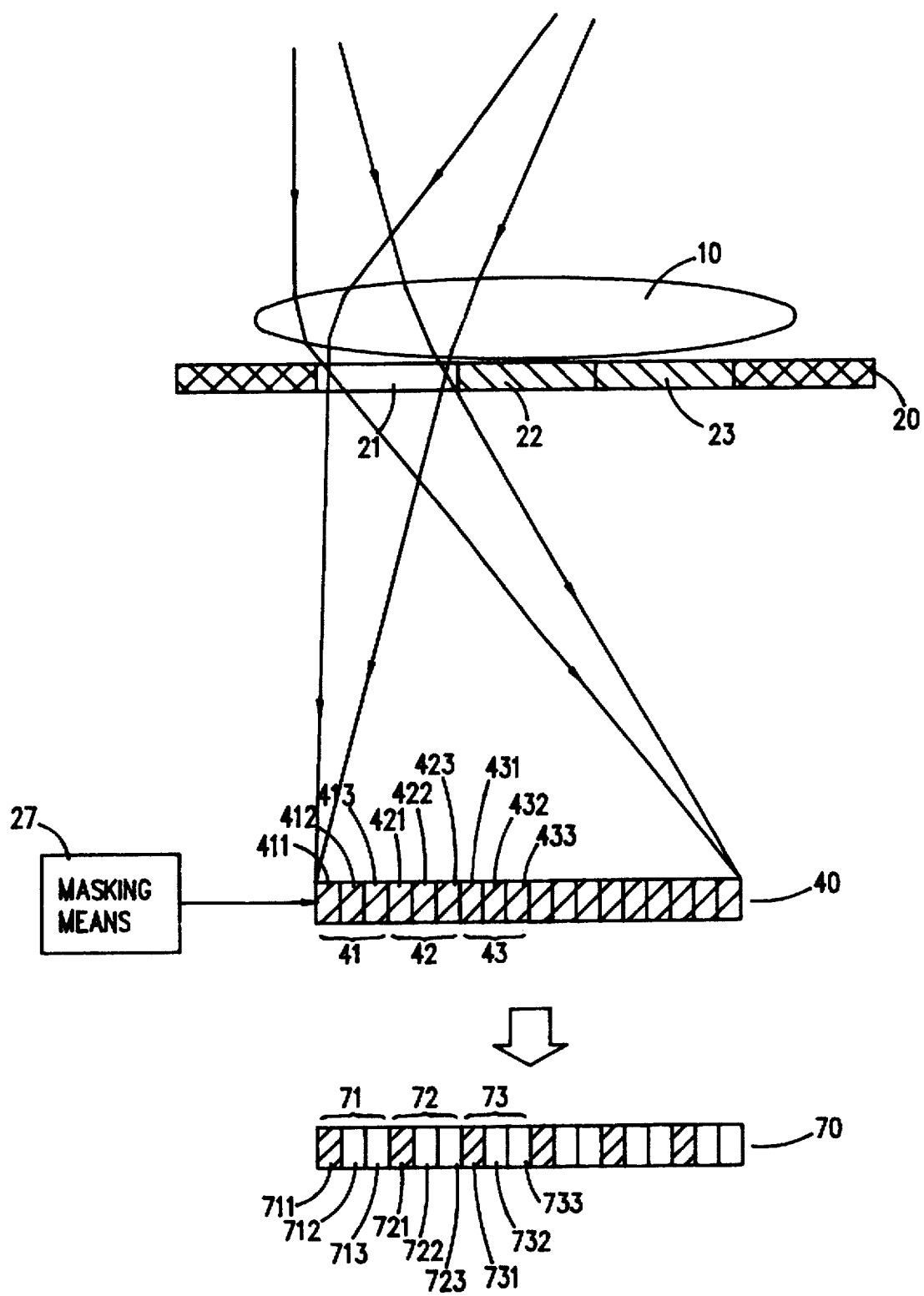
FIG. 1 to FIG.3 illustrate the method of producing a composite image in a camera using a large-aperture taking lens to form 2D images at different viewing angles and an aperture plate having a plurality of windows to select the viewing angles.

FIG. 1 illustrates the method of producing an orthostereoscopic composite image in a camera having a large-aperture taking lens, according to the present invention. As shown in FIG. 1, numeral 10 denotes a large-aperture taking lens which is used to form a plurality of 2D images of a scene over a range of viewing angles, with each image being formed through a different aperture section of the lens. A photosensitive medium 40, disposed in the image plane of the taking lens, is used to record the 2D images exposed thereon. An aperture plate 20, disposed in the close proximity of the taking lens 10, is used to change the viewing angle by controlling the light transmission path through different aperture sections of the taking lens 10. For illustrative purposes, the aperture of the taking lens 10 is effectively partitioned into three sections as the light transmission path through the taking lens is confined by three windows 21, 22 and 23 on the aperture plate 20. Windows 21, 22 and 23 can be selectively opened to transmit light or closed to block off light. Accordingly, an image formed on the photosensitive medium 40 is divided into a plurality of linear segments 41, 42, 43, . . . each having three linear bands. As shown, linear segment 41 consists of linear bands 411, 412, 413, linear segment 42 consists of linear bands 421, 422, 423 and so on. The photosensitive medium 40 is masked by masking means 27 such that when window 21 on the aperture plate 20 is opened to allow light to transmit through the left aperture section of the taking lens 10 to form a 2D image on the photosensitive medium 40, only the part of the 2D image falling on linear bands 411, 421, 431, . . . is allowed to become a part of the composite image 70. The composite image 70 comprises a plurality of linear portions 71, 72, 73 each of which comprises three image strips. As shown, linear portion 71 consists of image strips 711, 712, 713 which are associated with linear bands 411, 412, 413, respectively. Thus, when window 21 is opened for exposure, only image strips 711, 721, 731, . . . are formed on the composite image 70.

Figure 2:
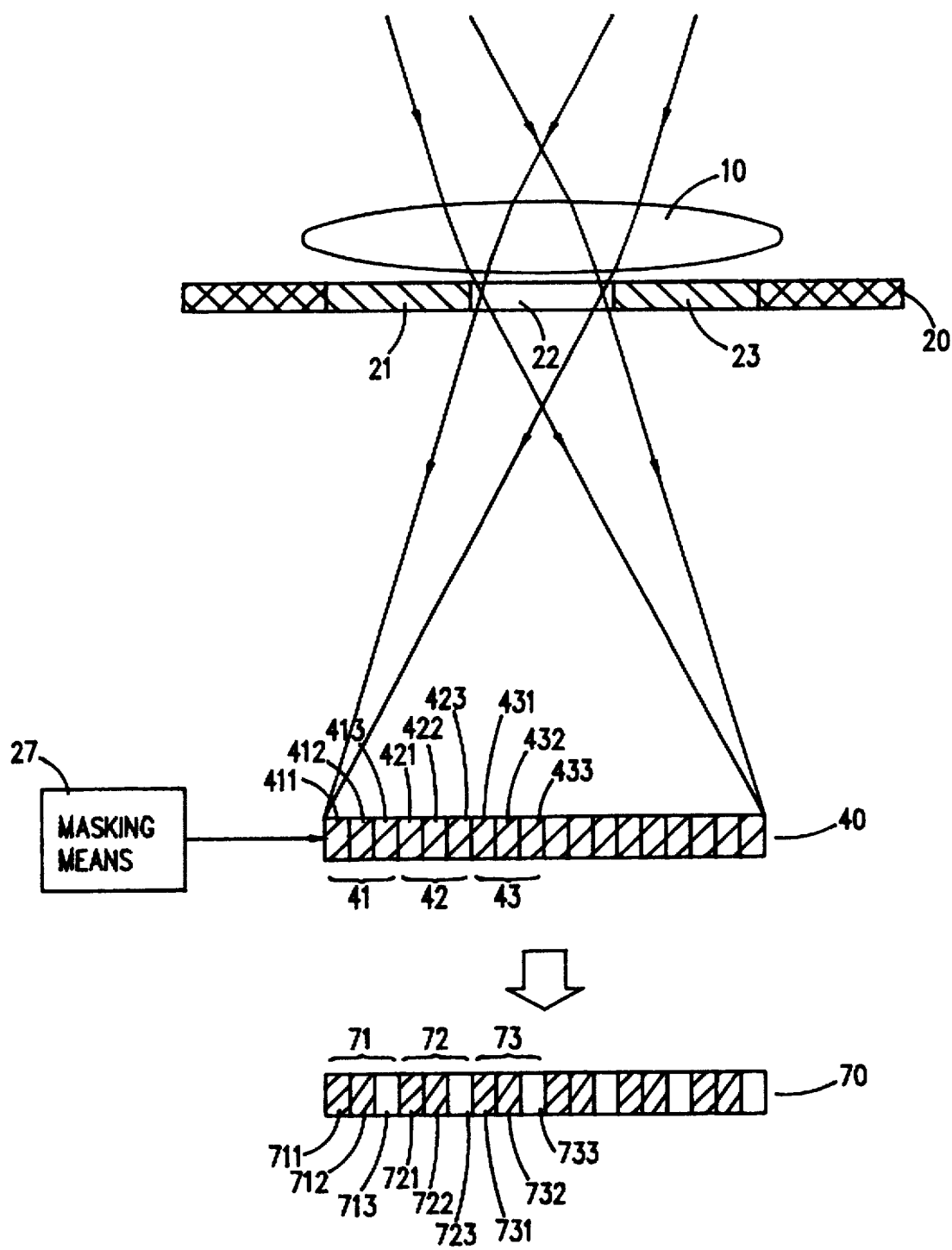

FIG.2 illustrates the same components in the camera as those shown in FIG. 1 except that the center window is opened allow to transmit through the center aperture section of the taking lens for image forming. FIG.2 shows that after image strips 711, 721, 731, . . . are formed on the composite image 70, window 22 on the aperture plate 20 is opened for exposure. The photosensitive medium 40 is masked differently by masking means 27 so that only the part of the 2D image falling on linear bands 412, 422, 432, . . . is allow to become a part of the composite image 70. As a result, image strips 712, 722, 732, . . . are added onto the composite image 70.

Figure 3:
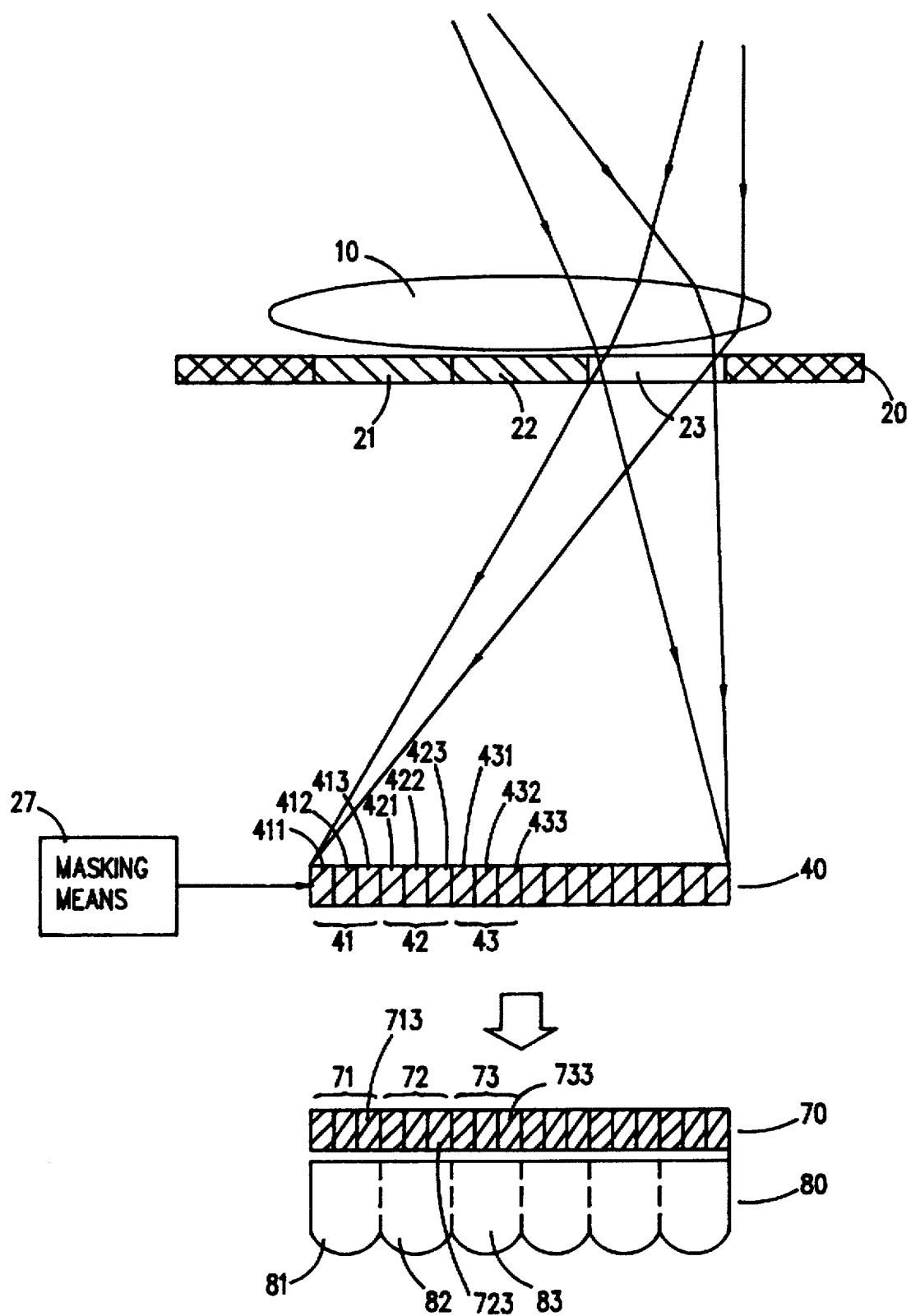

FIG.3 illustrates the same components in the camera as those shown in FIG. 1 except that the right window is opened allow light to transmit through the right aperture section of the taking lens for image forming. FIG.3 shows that after image strips 711, 712, 721, 722, 731, 732, . . . are formed on the composite image 70, window 23 on the aperture plate 20 is opened for exposure. Again the photosensitive medium 40 is masked differently by masking means 27 so that only the part of the 2D image falling on linear bands 413, 423, 433, . . . is allow to become a part of the composite image 70. As a result, image strips 713, 723, 733, . . . are added on to complete the composite image 70.

If the photosensitive medium 40 is an electronic imaging device, an electronic circuit integral to the electronic imaging device can be used for line-masking. For example, if a CCD chip comprising a plurality of pixel rows is used as a photosensitive medium, an associated circuit can be built to selectively eliminate the electric charge resulted from light exposure on certain pixel rows.

The composite image 70 can be displayed behind a lenticular screen 80 for 3D viewing. The lenticular screen 80 comprises a plurality of lenticules 81, 82, 83, . . . It is essential that the lenticular screen 80 is properly aligned with the composite image 70 such that each lenticule substantially covers one linear portion of the composite image.

Figure 4:
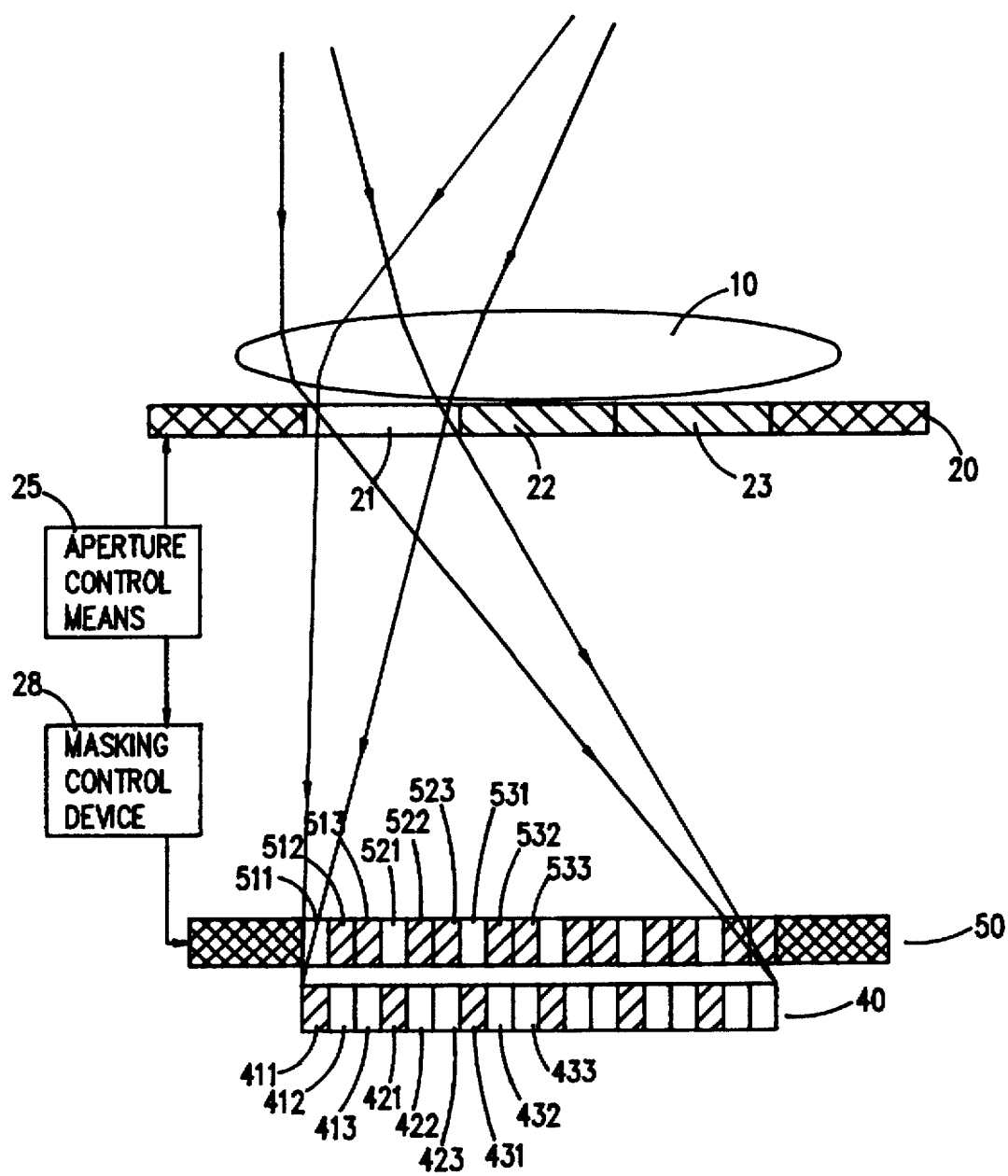
FIG.4 illustrates a light valve being used as a line-masking device.

FIG.4 illustrates a light valve being used as a line-masking device. As shown, a light valve 50 comprising linear strips 511, 512, 513, 521, 522, 523, 531, . . . is disposed in front of the photosensitive medium 40. The linear strips on the light valve can be selectively turned on to transmit light or turned off to block off light. When window 21 on the aperture plate 20 is opened by aperture control means 25 to allow light to transmit through the left aperture section of the taking lens to form a 2D image, a masking control device 28 synchronously turns on linear strips 511, 521, 531, . . . to allow only a part of a 2D image to be formed on the photosensitive medium 40, producing image bands 411, 421, 431, . . . under the turned-on linear strips. Note that the width of the image bands is substantially equal to the width of the linear strips of the light valve. Likewise, when windows 22 is opened to allow a 2D image to form through the center aperture section of the taking lens 10, linear strips 512, 522, 523, . . . on the light valve 50 produce different image bands on the photosensitive medium 40. After all three windows 21, 22, 23 are separately opened for exposure, the entire photosensitive medium is exposed to three 2D images, producing a complete composite image.

The aperture plate 20 can be an assembly of mechanical shutters or a light valve with a plurality of electro-optic windows. The aperture plate can be fixedly mounted relative to the taking lens.

Figure 5:
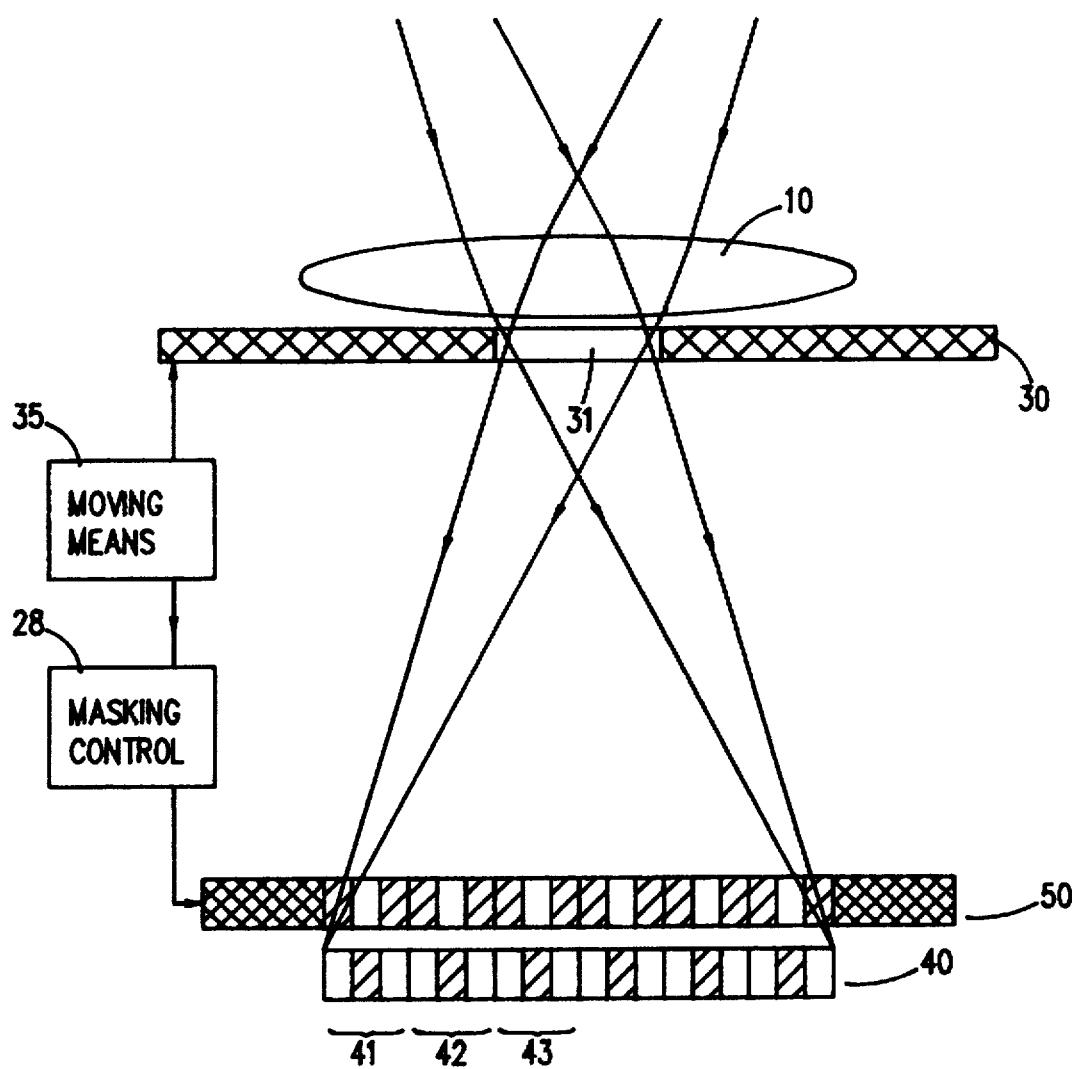
FIG.5 illustrates an aperture plate having only one window being used to select the viewing angles.

FIG. 5 shows an aperture plate having only one window being used to select the viewing angle. As shown in FIG.5, an aperture plate 30 having one window 31 for controlling the light transmission path through the taking lens 10. In order to allow a number of 2D images to form through different aperture sections of the taking lens, the aperture plate 30 is moved by moving means 35 to different positions relative to the taking lens 10. The linear strips on the light valve 50 are turned on or off by the masking control device in accordance with the position of window 35.

Figure 6:
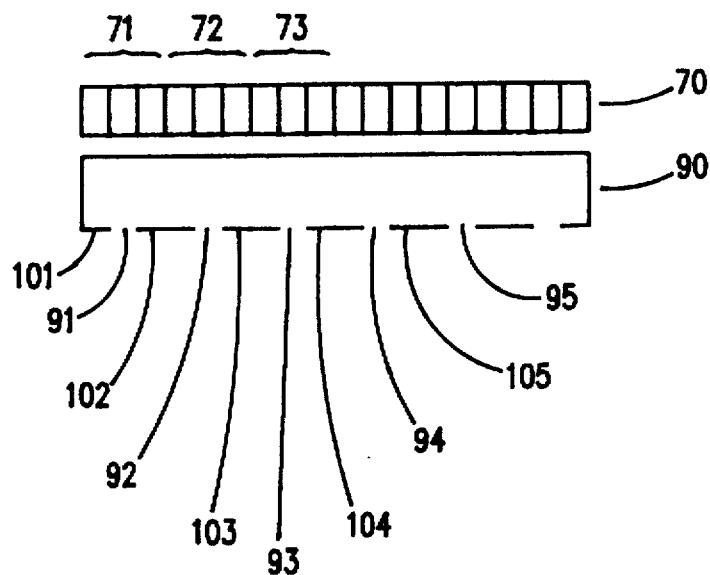
FIG.6 illustrates a parallax barrier being used for 3D viewing.

FIG.6 illustrates a parallax barrier being used for 3D viewing. In FIG.6, a parallax barrier 90 is placed in front of the composite image 70 to make a 3D display. As shown, the parallax barrier 90 comprises alternate blocking and clear strips. The blocking strips are denoted by numerals 101, 102, 103, . . . while the clear strips are denoted by numerals 91, 92, 93, . . . . It is well known that a parallax barrier, like a lenticular screen, is a view-separating screen having a plurality of view-separating elements to separate the views on a 3D display. The clear strips on a parallax barrier are equivalent to the lenticules on a lenticular screen.

While the present invention has been disclosed in preferred forms and the drawing figures are for illustrative purposes only, it shall be understood by those skilled in the art that many modifications, additions and deletions can be made therein without departing from the scope of the invention as set forth in the appended claims.

What is claimed is:

1. A method of producing a composite image in a camera comprising a large-aperture taking lens having a number of aperture sections to expose a plurality of 2D images of at least one scene onto a photosensitive medium disposed in the image plane of said taking lens, each of said 2D images having a plurality of linear segments each segment having a number of linear bands each band corresponding to one of said aperture sections of said taking lens, said method comprising the steps of:

a) opening one of said aperture sections at a time to expose one of said 2D images on said photosensitive medium; and b) selectively masking said photosensitive medium so as to allow in each linear segment of the exposed 2D image only the linear band corresponding to the opened aperture section to form a part of said composite image.

2. The method of claim 1 wherein the aperture sections of said taking lens are arranged from a leftmost position to a rightmost position along a horizontal direction and the linear bands in each of said segments in each of said 2D images are arranged from a leftmost position to a rightmost position along an axis parallel to said horizontal direction; the rightmost linear band corresponding to the rightmost aperture section and the leftmost linear band corresponding to the leftmost aperture section.

3. An apparatus for making a composite image comprising:

a) a taking lens having a number of aperture sections;

b) means for controlling said aperture sections so as to allow only one of said aperture sections to open at a time;

c) a photosensitive medium disposed in the image plane of said taking lens to acquire a plurality of 2D images with each 2D image being formed through an opened aperture section of said taking lens, each of said 2D images comprising a plurality of linear segments each segment having a number of linear bands each band corresponding to one of the aperture sections of said taking lens; and d) means for masking said photosensitive medium so as to allow in each linear segment of each of said 2D images only the linear band corresponding to the opened aperture section to form a part of said composite image.

4. The apparatus of claim 3 wherein the aperture sections of said taking lens are arranged from a leftmost position to a rightmost position along a horizontal direction and the linear bands in each of said segments in each of said 2D images are arranged from a leftmost position to a rightmost position along an axis parallel to said horizontal direction; the rightmost linear band corresponding to the rightmost aperture section and the leftmost linear band corresponding to the leftmost aperture section.

5. The apparatus of claim 3 wherein said masking means comprises a light valve having a plurality of linear strips selectively turned on to transmit light and turned off to block off light, each linear strip of said light valve being substantially equal in width to the linear bands of said 2D image.

6. The apparatus of claim 5 wherein said light valve comprises a LCD panel.

7. The apparatus of claim 3 wherein said controlling means comprises an aperture plate having a number of windows each being in registry with a different aperture sections of said taking lens, said windows selectively opened to transmit light and closed to block off light.

8. The apparatus of claim 3 wherein said controlling means comprises an aperture plate having one opening equal in width to the aperture sections of said taking lens, said aperture plate movably mounted in the close proximity of said taking lens to control the transmission of light through each of said aperture sections of said taking lens, said controlling means further comprising means for repositioning said aperture plate.

9. The apparatus of claim 3 wherein said masking means comprises an electronic circuit associated with said photosensitive medium for selectively transferring in each 2D image exposed on said photosensitive medium only the linear bands corresponding to the opened aperture section of said taking lens to form a part of said composite image.

10. The apparatus of claim 3 wherein said photosensitive medium comprising an electronic imaging device.

11. The apparatus of claim 3 wherein said photosensitive medium comprising a photographic emulsion.

12. A method of making a 3D display from a composite image of a scene produced in a camera comprising a large-aperture taking lens having a plurality of aperture sections to expose a plurality of 2D images of the scene onto a photosensitive medium disposed in the image plane of said taking lens, each of said 2D images having a plurality of linear segments each segment having a number of linear bands each band corresponding to one of said aperture sections of said taking lens, said composite image comprising a plurality of linear portions each portion having a plurality of image strips equal in number to said aperture sections, said method comprising the steps of:

a) opening one of said aperture sections at a time to expose one of said 2D images on said photosensitive medium; and b) selectively masking said photosensitive medium so as to allow in each linear segment of the exposed 2D image only the linear band corresponding to said opened aperture section to form one of said image strips on said composite image;

c) displaying said composite image behind a view-separating screen means comprising a plurality of view-separating elements with each view-separating element substantially covering a linear portion in said composite image.

13. The method of claim 12 wherein the aperture sections of said taking lens are arranged from a leftmost position to a rightmost position along a horizontal direction and the linear bands in each of said segments in each of said 2D images are arranged from a leftmost position to a rightmost position along an axis parallel to said horizontal direction; the rightmost linear band corresponding to the rightmost aperture section and the leftmost linear band corresponding to the leftmost aperture section.

14. The method of claim 12 wherein said view-separating screen means comprises a lenticular screen.

15. The method of claim 12 wherein said view-separating screen means comprises a parallax barrier.

* * * * *